United States Patent
Mauchle et al.

(10) Patent No.: US 10,589,302 B2
(45) Date of Patent: Mar. 17, 2020

(54) POWDER CONTAINER FOR A POWDER COATING STATION

(71) Applicant: GEMA SWITZERLAND GMBH, St. Gallen (CH)

(72) Inventors: Felix Mauchle, Abtwil (CH); Paulo Dos Reis, St. Gallen (CH)

(73) Assignee: GEMA SWITZERLAND GMBH, St. Gallen (CH)

( * ) Notice: Subject to any disclaimer, the term of this patent is extended or adjusted under 35 U.S.C. 154(b) by 0 days.

(21) Appl. No.: 15/526,745

(22) PCT Filed: Nov. 6, 2015

(86) PCT No.: PCT/EP2015/075961
§ 371 (c)(1),
(2) Date: May 12, 2017

(87) PCT Pub. No.: WO2016/075049
PCT Pub. Date: May 19, 2016

(65) Prior Publication Data
US 2017/0320079 A1    Nov. 9, 2017

(30) Foreign Application Priority Data
Nov. 14, 2014   (DE) .................. 10 2014 223 307

(51) Int. Cl.
*B05B 7/14*   (2006.01)
*B05B 14/45*  (2018.01)
(Continued)

(52) U.S. Cl.
CPC .......... *B05B 7/1459* (2013.01); *B05B 7/1454* (2013.01); *B05B 12/14* (2013.01);
(Continued)

(58) Field of Classification Search
CPC ........ B65G 53/16; B65G 53/36; B65G 53/52; B65G 53/66; B01D 2279/00; B05B 14/43;
(Continued)

(56) References Cited

U.S. PATENT DOCUMENTS

| 5,226,600 A * | 7/1993 | Frank ..................... B05B 1/3046 |
| | | 137/854 |
| 2012/0193451 A1* | 8/2012 | Sauer .................... B05B 9/0833 |
| | | 239/337 |
| 2013/0108379 A1* | 5/2013 | Mauchle ............... B05B 7/1404 |
| | | 406/110 |

FOREIGN PATENT DOCUMENTS

CH    529590 A  * 10/1972
DE    1427612 A1   10/1969
(Continued)

OTHER PUBLICATIONS

English Translation of CH529590, Prinzing et al, published Oct. 1972 (Year: 1972).*
(Continued)

*Primary Examiner* — Laura Edwards
(74) *Attorney, Agent, or Firm* — Kinney & Lange, P.A.

(57) ABSTRACT

Disclosed herein is a powder container for supplying coating powder to a powder coating station. The powder container includes a powder compartment for coating powder, the powder compartment being delimited by side walls, one of which is provided with an outlet port via which the powder compartment is or can be fluidically connected to an inlet of a powder deposition system. The effective flow cross-section of the fluid connection between the outlet port and the inlet of the powder deposition system can be variably adjusted.

17 Claims, 2 Drawing Sheets

(51) Int. Cl.
  *B05B 14/48* (2018.01)
  *B05B 14/43* (2018.01)
  *B05B 12/14* (2006.01)
  *B05C 19/04* (2006.01)
  *B05C 19/00* (2006.01)
  *B05C 19/06* (2006.01)
  *B05C 15/00* (2006.01)

(52) U.S. Cl.
  CPC .............. *B05B 14/43* (2018.02); *B05B 14/45* (2018.02); *B05B 14/48* (2018.02); *B05C 19/008* (2013.01); *B05C 19/04* (2013.01); *B05C 19/06* (2013.01); *B05C 15/00* (2013.01)

(58) Field of Classification Search
  CPC ....... B05B 14/45; B05B 14/48; B05B 7/1459; B05B 12/14; B05B 7/1454; B05C 15/00; B05C 19/00; B05C 19/008; B05C 19/04; B05C 19/06; Y10S 55/46
  USPC ...... 406/10, 14, 136, 13; 118/603, 610, 308, 118/326, 708; 55/315, 459.1, DIG. 46; 96/417, 421
  See application file for complete search history.

(56) References Cited

FOREIGN PATENT DOCUMENTS

| | | | |
|---|---|---|---|
| DE | 2546920 | A1 | 5/1976 |
| DE | 3704551 | C1 | 5/1988 |
| DE | 4239496 | A1 | 5/1994 |
| DE | 29518615 | U1 | 1/1996 |
| DE | 19823068 | A1 | 11/1999 |
| DE | 102006034378 | A1 | 1/2008 |
| DE | 102010039473 | A1 | 2/2012 |
| DE | 2010041552 | * | 3/2012 |
| EP | 0940189 | A2 | 9/1999 |
| GB | 1336872 | | 11/1973 |
| GB | 1422440 | | 1/1976 |
| WO | 9702895 | A2 | 1/1997 |
| WO | 2014161717 | A1 | 10/2014 |

OTHER PUBLICATIONS

International Preliminary Report on Patentability, for PCT Patent Application No. PCT/EP2015/075961, dated May 16, 2017, 5 pages.

First German Office Action, for German Patent Application No. 10 2014 223 307.0, dated Jul. 31, 2015, 12 pages.

International Search Report (English translation) and Written Opinion dated Mar. 16, 2016 for corresponding PCT Application No. PCT/EP2015/075961.

First Chinese Office Action dated Dec. 4, 2018, received for corresponding Chinese Application No. 201580061045.2.

* cited by examiner

POWDER CONTAINER FOR A POWDER COATING STATION

BACKGROUND

The present invention relates to a powder container for supplying coating powder to a spray coating system.

The powder container according to the invention is in particular suitable for the powder supply of a powder coating system used to electrostatically spray coat powder onto objects in which fresh coating powder (hereinafter also called "fresh powder") and, as applicable, reclaimed powder (hereinafter also called "recovered powder") is situated in the powder container and is supplied by a powder-dispensing device in the form of, for example, an injector, a powder pump or a spraying mechanism, in particular a spray gun. The spraying mechanism can be for example a manual spray gun or an automatic gun.

Fresh powder is supplied to the powder container as needed via a fresh powder line from a supplier's container in which the powder supplier supplies the fresh powder to the powder user.

The powder forms a compact mass inside the supplier's container. By contrast, the coating powder should be in a fluidized state in the powder container so that it can for example be drawn out by the suction power of an injector or by means of a dense phase pump and supplied to the spraying mechanism in a flow of compressed air. The powder container thus serves as a powder chamber for storing coating powder, whereby the coating powder in the powder container is normally fluidized so that it can be easily conveyed pneumatically, either to another powder container or to a powder spraying mechanism. As indicated above, the latter can be a manual or an automatic powder spraying mechanism which can comprise, for example, a spray nozzle or a rotary atomizer.

The invention is therefore based on the problem of powder coating systems and associated powder containers needing to be thoroughly cleaned when changing powder (changing from one type of powder to another type of powder), in particular when changing color (changing from a powder of a first color to a powder of a second color), since even just a few powder particles of the previous powder type can result in coating defects when coating with the new powder type.

One task to therefore be solved by the invention is that of providing a possibility for easily changing powder as quickly as possible.

SUMMARY

Thus, specified in particular is a powder container for supplying coating powder to a spray coating system, wherein the powder container comprises a powder chamber for coating powder delimited by side walls. An outlet opening is provided in a side wall of the powder container via which the powder chamber is or can be fluidly connected to an inlet of a powder separation system. It is in particular provided according to an embodiment of the invention for the effective flow cross section of the fluidic connection between the outlet opening of the powder container and the inlet of the powder separation system to be variably adjustable.

By the powder chamber of the powder container being fluidly connected or connectable to the inlet of the powder separation system via the at least one outlet opening provided in a side wall of the powder container, wherein the effective flow cross section of the fluidic connection between the outlet opening of the powder container and the inlet of the powder separation system is moreover variably adjustable, it becomes possible to adapt the powder container to the powder separation system or, respectively, coordinate these two components in a simple to realize yet effective manner. Hence, both in powder-coating mode; i.e. when the spray coating system is being supplied with coating powder from the powder container, as well as in cleaning mode, i.e. when the powder container and conceivably the other components of the spray coating system are being cleaned, the compressed air introduced into the powder chamber of the powder container can thereby always be supplied via the at least one outlet opening provided in the side wall of the powder container in fluidic connection with the variably adjustable effective flow cross section of the powder separation system.

Since depending on operating mode (powder-coating mode or cleaning mode), different amounts of compressed air (fluidizing compressed air or cleaning compressed air) are introduced into the powder chamber of the powder container per unit of time, it is necessary to be able to accordingly vary the effective flow cross section of the fluidic connection between the one outlet opening in the side wall of the powder container to the inlet of the powder separation system so that the pressure ratios in the powder chamber and at the inlet of the powder separation system will be within the permissible ranges. This adjustment can be easily realized with the disclosed solution and thereby in particular by the effective flow cross section of the fluidic connection being variably adjustable.

Thus, in particular able to be achieved by the variable adjusting of the effective flow cross section of the fluidic connection between the powder chamber and the inlet of the powder separation system is still being able to use the fluidic connection between the powder chamber and the inlet of the powder separation system when changing from a powder-coating mode to a cleaning mode in order to then supply cleaning compressed air to the separation system during the cleaning mode. On the other hand, fluidizing compressed air introduced into the chamber for fluidizing the coating powder can be supplied to the inlet of the powder separation system via the same outlet opening during the powder-coating mode.

In one possible realization of the inventive solution, a control device is provided which is designed to regulate the effective flow cross section of the fluidic connection between the at least one outlet opening of the powder container and the inlet of the powder separation system as a function of the spray coating system or powder container operating mode. In particular provided hereby is the enlarging of the effective flow cross section of the fluidic connection between the outlet opening of the powder container and the inlet of the powder separation system when the operating mode of the spray coating system or the operating mode of the powder container respectively changes from a powder-coating mode to a cleaning mode.

On the other hand, it would be advantageous in this context for the control device to be designed to accordingly reduce the effective flow cross section of the fluidic connection between the outlet opening of the powder container and the inlet of the powder separation system when the operating mode of the spray coating system or the powder container changes from a cleaning mode to a powder-coating mode.

Alternatively or additionally to the above-cited embodiments, it is conceivable to provide a control device which is designed to regulate the effective flow cross section of the fluidic connection between the outlet opening in the side wall of the powder container and the inlet of the powder separation system as a function of the amount of compressed air, in particular fluidizing compressed air and/or cleaning compressed air, supplied to the powder container per unit of time. In conjunction hereto, it is particularly of advantage for the effective flow cross section to be enlarged when the amount of compressed air supplied to the powder container per unit of time exceeds a predetermined value and for the effective flow cross section to be correspondingly reduced when the amount of compressed air supplied to the powder container per unit of time falls below a predetermined value.

In a further embodiment of the inventive solution, a pressure sensor system is provided in order to measure the resulting pressure in the powder container. Conceivable in this context would thereby be regulating the effective flow cross section of the fluidic connection between the outlet opening in the side wall of the powder container and the inlet of the powder separation system as a function of the measured pressure such that the measured pressure value does not exceed a predetermined pressure value. This enables always ensuring that no inordinate excess pressure can build up in the powder container. Instead, the amount of air supplied per unit of time in such a case to the inlet of the powder separation system is increased accordingly.

Alternatively or additionally, it is conceivable in this context to detect a difference between the pressure in the powder container and a pressure at the inlet of the powder separation system, whereby the effective flow cross section of the fluidic connection between the outlet opening in the side wall of the powder container and the inlet of the powder container can be set as a function of the detected pressure difference such that the detected pressure difference neither exceeds nor falls short of a predetermined amount.

BRIEF DESCRIPTION OF THE DRAWINGS

The following will reference the accompanying drawings in describing an example embodiment of the inventive solution.

Shown are.

DETAILED DESCRIPTION

Figure 1:
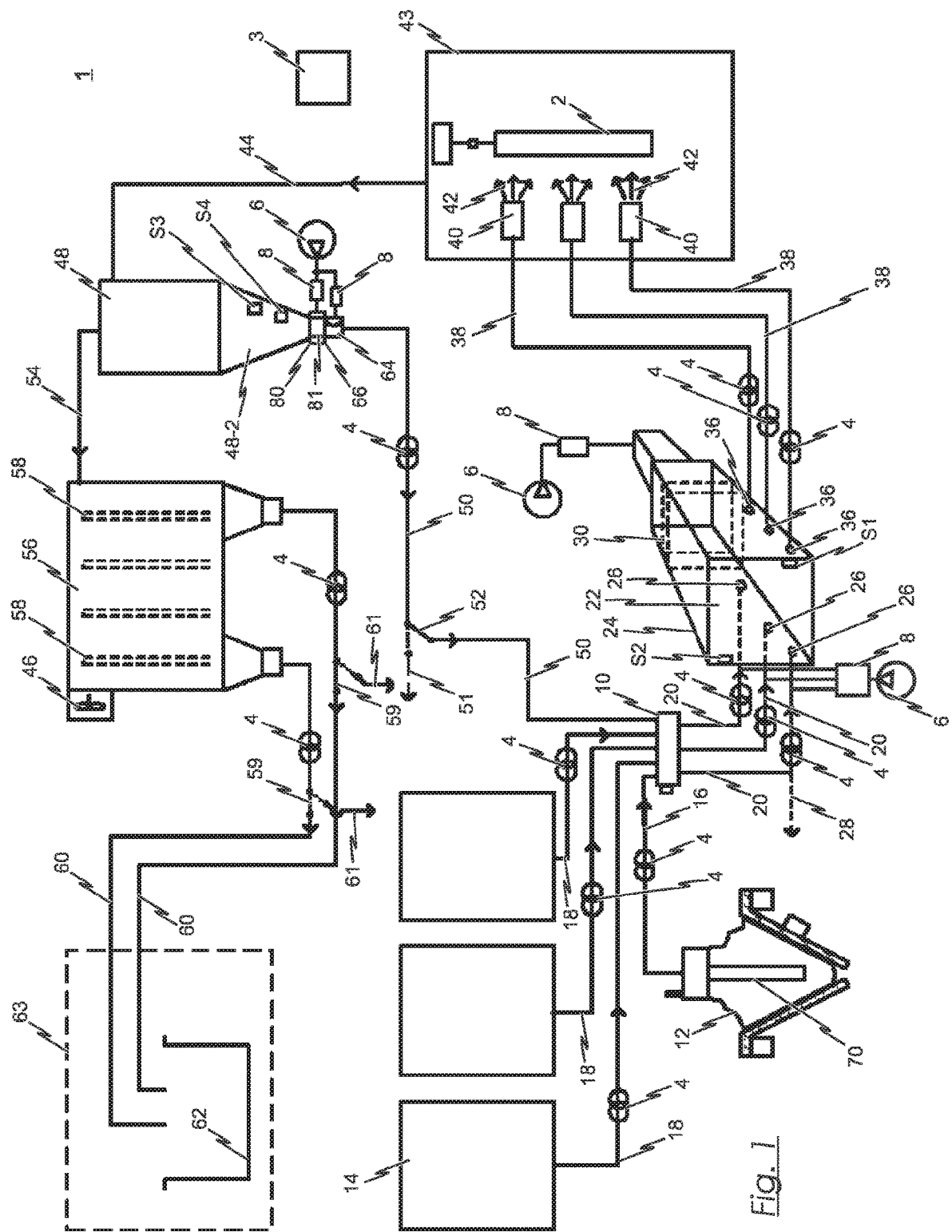
FIG. 1 a schematic view of a powder coating system having a powder container used to supply powder according to the invention.

FIG. 1 shows an example embodiment of a powder coating system 1 according to the inventive solution in schematic view. The powder coating system 1 serves in the spray coating of objects 2 with coating powder which is thereafter fused onto the objects 2 in a furnace not depicted in FIG. 1. One or more electronic control devices 3 are provided for controlling the operation of the powder coating system 1.

Powder pumps 4 are provided for pumping the coating powder pneumatically. Same can be injectors in which coating powder media is suctioned out of a powder container by compressed air serving as conveying air, whereupon the mixture of conveying air and coating powder then flows together into a container or to a spraying mechanism.

Suitable injectors are known for example from printed publication EP 0 412 289 B1.

Powder pumps used as powder pump 4 can also be of such type which consecutively pump small doses of powder via compressed air, whereby each small dose of powder (powder volume) is stored in a powder chamber and then expelled from the powder chamber by means of compressed air. The compressed air stays behind the dose of powder and pushes it forward. These types of pumps are sometimes referred to as "compressed air thrust pumps" or "plug conveyance pumps" because the compressed air thrusts the stored portion of powder forward ahead of itself through a pump discharge line like a plug. Various types of such powder pumps for conveying dense coating powder are known for example from the following printed publications: DE 103 53 968 A1, U.S. Pat. No. 6,508,610 B2, US 2006/0193704 A1, DE 101 45 448 A1 or WO 2005/051549 A1.

The invention is not limited to any one of the cited types of powder pumps.

To generate the compressed air for pneumatically pumping the coating powder and for fluidizing said coating powder, a compressed air source 6 is provided which is connected to the various devices by corresponding pressure setting elements 8, e.g. pressure regulators and/or valves.

Fresh powder from a powder supplier is dispensed from a supplier's container, which for example can be a small container 12, e.g. in the form of a dimensionally stable container or a bag containing a powder quantity of for example between 10 to 50 kg, or for example a large container 14, e.g. having a powder quantity of for example between 100 kg and 1000 kg, into a fresh powder line 16 or 18 of a sieving device 10 by means of a powder pump 4. The sieving device 10 can be provided with a vibrator 11. The coating powder sifted through the sieving device 10 is conveyed through at least one powder inlet opening 26, 26' in a powder chamber 22 of a dimensionally stable powder container 24 via one or more powder feed lines 20, 20' by gravity or preferably by a respective powder pump 4. The volume of the powder chamber 22 is preferably less than the volume of small fresh powder container 12.

According to one conceivable realization of the inventive solution, the powder pump 4 of the at least one powder feed line 20, 20' to the powder container 24 is a compressed air thrust pump. The first section of the powder feed line 20 can hereby serve as a pump chamber in which sifted powder from the sieving device 10 falls through a valve, for example a pinch valve. After this pump chamber holds a certain portion of powder, the powder feed line 20 is fluidly separated from the sieving device 10 by closing the valve. The dose of powder is thereafter pushed through the powder feed line 20, 20' into the powder chamber 22 by compressed air.

Powder pumps 4, e.g. injectors or compressed air thrust pumps, are connected to one or preferably a plurality of powder outlet openings 36 of the powder container 24 to pump coating powder through the powder lines 38 to spraying mechanisms 40. The spraying mechanisms 40 can comprise spray nozzles or rotary atomizers to spray the coating powder 42 onto the object 2 to be coated, which is preferably situated in a coating booth 43.

The powder outlet openings 36 can be—as shown in FIG. 1—arranged in a wall of the powder container 24 which is opposite from the wall in which the at least one powder inlet opening 26 is arranged. Alternatively, however, the powder outlet openings 36 can also be disposed in a wall which is adjacent to the wall in which the at least one powder inlet opening 26 is arranged. The powder outlet openings 36 are preferably arranged near the bottom of the powder chamber 22.

The powder chamber 22 is preferably of a size in the range of a coating powder volumetric capacity of between 60 to 100 liters. Depending on the number of powder outlet openings 36 and attached powder lines 38, the size of powder chamber 22 is selected so as to enable continuous spray coating operation but yet enables the powder chamber 22 to be cleaned, preferably automatically, during coating breaks for powder change.

The powder chamber 22 can be provided with a fluidizing device 30 for fluidizing the coating powder taken into the powder container 24. The fluidizing device 30 comprises at least one fluidizing wall of an open-pored or narrow-holed material which is permeable to compressed air but not to coating powder. Although not shown in FIG. 1, it is advantageous with powder container 24 for the fluidizing wall to form the floor of the powder container 24 and be disposed between the powder chamber 22 and a fluidizing compressed air chamber. The fluidizing compressed air chamber is to be connectable to the compressed air source 6 by means of a pressure setting element 8.

Coating powder 42 which does not adhere to the object 2 to be coated will be suctioned into a cyclone separator 48 as excess powder through an excess powder line 44 by a flow of suction air from a blower 46. The cyclone separator 48 separates as much excess powder from the suction air flow as possible. The separated portion of powder is then supplied as reclaimed or recovered powder through a reclaimed powder line 50 from the cyclone separator 48 to the above-cited sieving device 10 where it passes through the sieving device 10, either alone or mixed with fresh powder via powder feed lines 20, 20', to re-enter the powder chamber 22.

Depending on the type of powder and/or how contaminated the powder is, the option can be provided of separating the reclaimed powder line 50 from the sieving device 10 and routing the reclaimed (recovered) powder into a waste receptacle as is schematically depicted in FIG. 1 by dotted line 51. So that the reclaimed powder line 50 does not need to be separated from the sieving device 10, it can be provided with a gate 52, at which it is alternatively connectable to the sieving device 10 or to a waste receptacle.

The powder container 24 can comprise one or more, for example two, sensors 51 and/or S2, to control the supply of coating powder in the powder chamber 22 by means of the control device 3 and the powder pumps 4 in the powder feed lines 20, 20'. For example, the lower sensor 51 detects a lower powder level limit and the upper sensor S2 an upper powder level limit.

The lower end section 48-2 of the cyclone separator 48 can be designed and used as a storage container for reclaimed powder and provided with one or more, preferably two, sensors S3 and/or S4 operatively coupled to the control device 3 for that purpose. Doing so allows for example automatically stopping the fresh powder feed through fresh powder lines 16, 18 as long as there is enough reclaimed powder in the cyclone separator 48 to supply a sufficient amount of reclaimed powder to the powder chamber 22 through the sieving device 10 as required by the spraying mechanisms 40 for the spray coating operation. When there is no longer enough reclaimed powder in the cyclone separator 48 for that purpose, there can be an automatic switching to the fresh powder being supplied through the fresh powder feed lines 16, 18. There is also the further possibility of simultaneously supplying fresh powder and reclaimed powder to the sieving device 10 so that they are mixed together.

The exhaust air of the cyclone separator 48 is routed via an exhaust line 54 into an afterfilter device 56 where it runs through one or more filter elements 58 to the blower 46 and from there into the external atmosphere. The filter elements 58 can be filter bags, filter cartridges, filter plates or other similar filter elements. The powder which the filter elements 58 separate from the air flow is normally waste powder and falls into a waste receptacle under the force of gravity or it can be pumped, as shown in FIG. 1, into a waste receptacle 62 at a waste station 63 via one or more waste lines 60, each comprising a respective powder pump 4.

Depending on the type of powder and powder coating conditions, the waste powder can also be reclaimed again for the sieving device 10 so as to end up back in the coating circuit. This is schematically shown in FIG. 1 by gates 59 and branch lines 61 of the waste lines 60.

Multi-color operation, in which different colors are each only sprayed for a short time, normally uses the cyclone separator 48 and the afterfilter device 56 and the waste powder of the afterfilter device 56 ends up in waste receptacle 62. While the powder separating efficiency of the cyclone separator 48 is usually less than that of the afterfilter device 56, it can however be cleaned more quickly than the afterfilter device 56.

In single-color operation, in which the same powder is used for a long period of time, it is possible to dispense with the cyclone separator 48 and connect the excess powder line 44 to the afterfilter device 56 instead of the exhaust air line 54 and connect the waste lines 60, which in this case contain reclaimed powder, to the sieving device 10 as reclaimed powder lines.

The cyclone separator 48 is then normally only used in single-color operation in combination with the afterfilter device 56 in cases of problematic coating powder. In this case, only the reclaimed powder of the cyclone separator 48 will be resupplied via the powder reclaimed line 50 of the sieving device 10 while the waste powder of the afterfilter device 56 will end up as waste in the waste receptacle 62 or another waste receptacle which can be positioned directly below an outlet opening of the afterfilter device 56 without waste lines 60.

The lower end section 48-2 of the cyclone separator 48 designed as a storage container can be provided with an outlet valve 64 in or at the lower end of a fluidizing device 66 for fluidizing the coating powder. The fluidizing device 66 comprises at least one fluidizing wall 80 of an open-pored or narrow-holed material which is permeable to compressed air but not to coating powder. The fluidizing wall 80 is arranged between the powder path and a fluidizing compressed air chamber 81. The fluidizing compressed air chamber 81 is connectable to the compressed air source 6 by means of a pressure setting element 8.

The fresh powder line 16 and/or 18 can be fluidly connected at its upstream end either directly or by means of powder pump 4, to a powder conveying tube 70 which is able to dip into the supplier container 12 or 14 to draw up fresh coating powder. The powder pump 4 can be arranged in the fresh powder line 16/18 at its start, end or therebetween or at the upper or lower end of the powder conveying tube 70.

The at least one powder inlet opening 26 is preferably arranged in a side wall of the powder container 24, in particular near the bottom of the powder chamber 22. In place of a powder inlet opening 26, however, it is also conceivable for the powder chamber 22 of the powder container 26 to be able to be filled with fresh powder and/or recovered powder from above by means of an opening able to be closed by a cover.

As noted above, the powder container 24 is preferably equipped with a fluidizing device 30 in order to introduce fluidizing compressed air into the powder chamber 22 at least during the powder-coating mode of the powder coating system 1. The powder container 24 further comprises at least one fluidizing compressed air outlet 31 having an outlet opening through which the fluidizing compressed air introduced into the powder chamber 22 can be discharged again for the purpose of at least partial pressure equalization.

The powder container 24 preferably comprises a substantially rectangular powder chamber 22 for accommodating coating powder. Although not depicted in the drawings, at least one cleaning compressed air inlet can be provided in a side wall of the powder container 24 to which a compressed air source 6 for introducing compressed cleaning air into the powder chamber 22 can be connected in a cleaning mode of the powder coating system 1, or the powder container 24 respectively, for removing residual powder from the powder chamber 22 via a compressed air line.

A residual powder outlet 34 is further provided in at least one of the side walls of the powder container 24 which comprises an outlet opening through which residual powder can be driven out of the powder chamber 22 by means of the compressed cleaning air introduced into the powder chamber 22 during the cleaning mode of the powder coating system 1 or powder container 24.

The solution disclosed herein is characterized in particular by the outlet opening of the residual powder outlet 34 being able to be identical to the outlet opening 32 of the fluidizing compressed air outlet 31. As noted above, the fluidizing compressed air outlet 31 serves in purging the fluidizing compressed air introduced into the powder chamber 22 during the powder-coating mode and in effecting an equalizing of pressure so that the pressure within the powder chamber 22 will not exceed a predetermined maximum pressure during the operation of the fluidizing device 30.

In conjunction hereto, it is advantageous for the fluidizing compressed air outlet 31 to comprise a vent line which is connected or connectable to a riser tube external of the powder chamber 22 in order to minimize or respectively prevent a discharge of powder from the powder chamber 22 during the powder-coating mode of the powder coating system 1.

To purge the fluidizing compressed air introduced into the powder chamber 22, it is further conceivable to provide a vent line which preferably extends into the upper region of the powder chamber 22.

Figure 2:
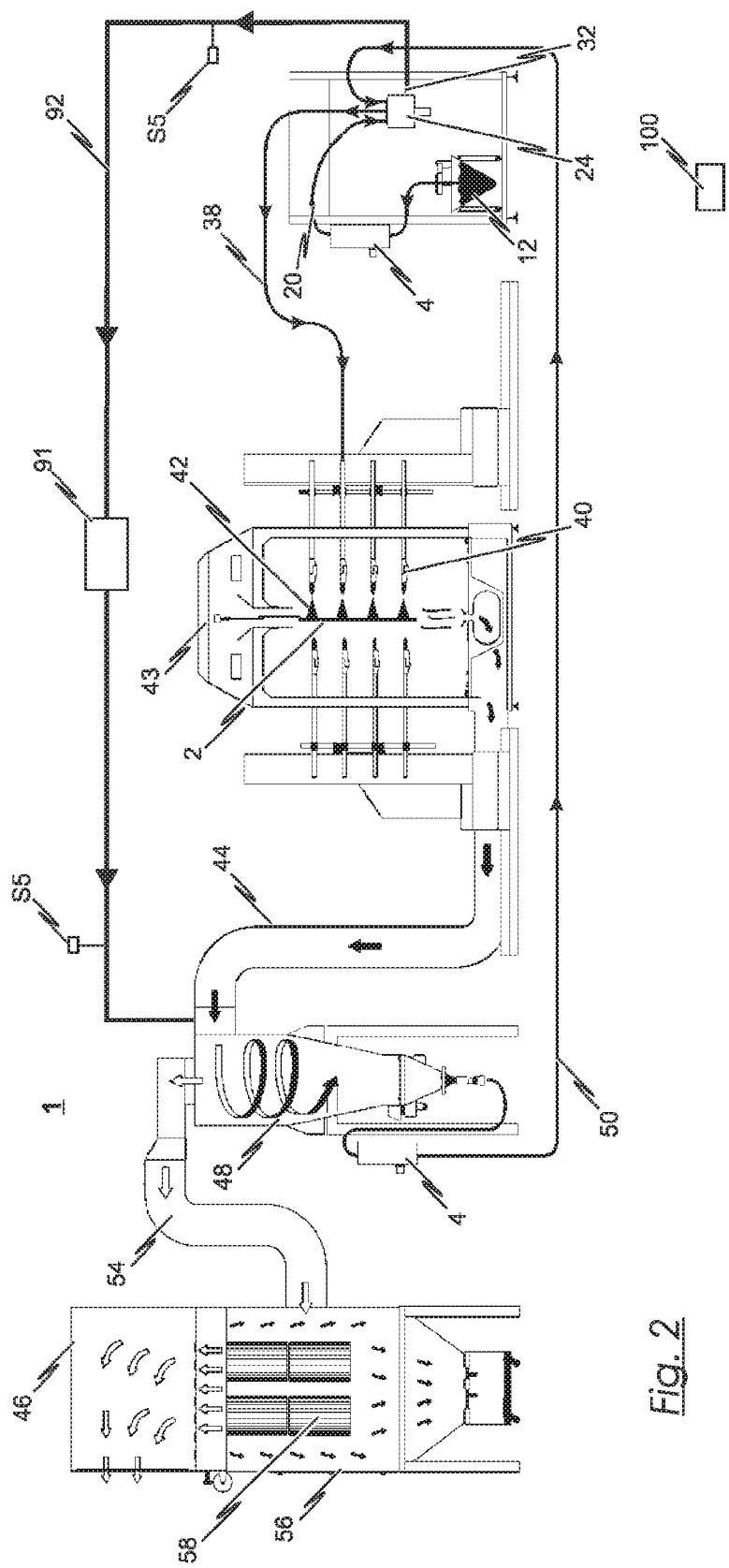
FIG. 2 a schematic view of a further powder coating system having a powder container in accordance with the invention.

As can particularly be learned from the FIG. 2 depiction, the disclosed solution provides for the outlet opening 32 to be fluidly connected to the inlet of a powder separation system (here: cyclone separator 48 with downstream afterfilter device 56). So that the outlet opening 32 can be used for both purging the previously introduced fluidizing compressed air (together with co-extracted coating powder as applicable) as well as for purging residual powder during the powder-coating mode, a mechanism 91 for regulating the effective flow cross section is provided according to the present invention in the fluidic connection 92 between the outlet opening 32 in the side wall of the powder container 24 and the inlet of the powder separation system.

In the schematically depicted embodiment, said mechanism 91 enables the variable adjusting of the effective flow cross section of the fluidic connection 92 between the outlet opening 32 of the powder container 24 and the inlet of the powder separation system in order to adapt the negative pressure conditions at the inlet of the powder separation system created by said powder separation system or blower 46 respectively and the maximally permissible positive pressure in the powder chamber 22 to the respective operating conditions.

In detail, and as shown schematically in FIG. 2, a control device 100 is provided in one preferential realization of the disclosed solution which is designed to set the effective flow cross section of the fluidic connection 92 between the outlet opening 32 of the powder container 24 and the inlet of the powder separation system as a function of an operating mode of the spray coating system 1 or the powder container 24 and preferably do so automatically. To be understood as an operating mode here is in particular a cleaning mode and a powder-coating mode.

While the fluidizing compressed air previously introduced into the powder chamber 22 is to be purged through the outlet opening 32 during the powder-coating mode, which is on an order of magnitude of 0.2 to 10 standard cubic meters per hour, a substantially higher volume of compressed air (cleaning compressed air) is to be discharged via the outlet opening 32 during the cleaning mode. As noted above, the cleaning compressed air can be introduced into the powder chamber 22 via a cleaning compressed air inlet 33. The volume of cleaning compressed air to be discharged per hour during the cleaning mode is on an order of magnitude of 200 to 2000 standard cubic meters.

In a preferential further development of the previously cited embodiment, the control device 100 is in particular designed to enlarge the effective flow cross section of the fluidic connection 92 between the outlet opening 32 and the inlet of the powder separation system by means of mechanism 91 when the operating mode of the spray coating system 1 or the powder container 24 changes from a powder-coating mode to a cleaning mode or vice versa.

Alternatively to the previously cited embodiments, it is further conceivable for the control device 100 to be designed such that the effective flow cross section of the fluidic connection 92 is adjusted as a function of the volume of compressed air, in particular fluidizing compressed air (in powder-coating mode) and cleaning compressed air (in cleaning mode) fed to the powder container 24 per unit of time. In this context, it would be conceivable for the effective flow cross section of the fluidic connection 92 to be preferably automatically increased when the volume of compressed air supplied to the powder container 24 per unit of time exceeds a predetermined value.

As indicated schematically in FIG. 2, it is conceivable to provide a pressure sensor system S5 in order to be able to detect the resulting (air) pressure in the powder container 24. In this context, it is expedient for the control device 100 to be designed such that the effective flow cross section of the fluidic connection 92 is preferably automatically regulated as a function of the detected pressure such that the detected pressure value does not exceed a predetermined pressure value.

On the other hand, it is conceivable for the pressure sensor system S5 to determine a difference between the pressure in the powder container 24 and a pressure at the inlet of the powder separation system, whereby the control device 100 then preferably automatically regulates the effective flow cross section of the fluidic connection 92 as a function of the detected pressure difference such that the detected pressure value does not exceed or fall short of a predetermined pressure value.

The mechanism 91 for regulating the effective flow cross section of the fluidic connection 92 preferably comprises a valve gate, a butterfly valve or a variably adjustable pinch valve.

The invention is not limited to the example embodiments depicted in the drawings but rather yields from an integrated consideration of all the features disclosed herein in context.

Particularly conceivable in this context is additionally providing a controllable gate in order to connect the outlet opening 32 of the powder container 24 directly to the external atmosphere when needed. Doing so is for example necessary or sensible when it needs to be ensured that only compressed air and no coating powder is discharged via the outlet opening 32 of the powder container 24.

In conjunction hereto, it is for example conceivable for the cited gate to comprise a Y-piece which is fluidly connected or connectable on one side to the powder chamber 22 via the outlet opening 32 provided in the side wall of the powder container 24 and connected on the other side to the external atmosphere or to the inlet of the powder separation system.

It can moreover be of advantage for at least one powder outlet to be provided in the bottom wall of the powder container 24 which can preferably be opened by means of a pinch value in order to remove coating powder as needed from the powder chamber preferably by the force of gravity.

The invention is in particular not only directed toward a powder container for a spray coating system but also toward a spray coating system for the spray coating of objects with coating powders, wherein the spray coating system comprises at least one powder container of the type described above, at least one spray-coating station or spray-coating booth for spray coating objects, and at least one powder separation system.

The invention claimed is:

1. A system comprising a powder coating system, a powder separation system, and a powder container configured to supply coating powder to the powder coating system,
wherein the powder container comprises a powder chamber for coating powder delimited by side walls,
wherein at least one powder inlet opening is provided in a side wall of the powder chamber,
wherein an outlet opening is provided in an opposing side wall of the powder container via which the powder chamber is configured to be fluidly connected to an inlet of the powder separation system,
wherein an effective flow cross section of a fluidic connection between the outlet opening and the inlet of the powder separation system is configured to be variably adjustable,
wherein one or more controllers are further provided,
wherein a first controller of the one or more controllers is configured to regulate the effective flow cross section of the fluidic connection between the outlet opening and the inlet of the powder separation system as a function of an operating mode of the powder coating system or powder container, and
wherein:
the first controller is configured to increase the effective flow cross section of the fluidic connection between the outlet opening and the inlet of the powder separation system when the operating mode of the powder coating system or powder container changes from a powder-coating mode to a cleaning mode by controlling a valve or gate provided in the fluidic connection between the outlet opening and the inlet of the powder separation system; and/or
the first controller is configured to reduce the effective flow cross section of the fluidic connection between the outlet opening and the inlet of the powder separation system when the operating mode of the powder coating system or powder container changes from a cleaning mode to a powder-coating mode by controlling the valve or gate provided in the fluidic connection between the outlet opening and the inlet of the powder separation system.

2. The system according to claim 1,
wherein a second controller of the one or more controllers is configured to regulate the effective flow cross section of the fluidic connection between the outlet opening and the inlet of the powder separation system as a function of an amount of compressed air supplied to the powder container per unit of time by a compressed air source, the effective flow cross section being regulated by controlling the valve or gate provided in the fluidic connection between the outlet opening and the inlet of the powder separation system.

3. The system according to claim 2,
wherein the second controller is configured to increase the effective flow cross section of the fluidic connection between the outlet opening and the inlet of the powder separation system when the amount of compressed air supplied to the powder container per unit of time exceeds a predetermined value; and/or
wherein the second controller is configured to reduce the effective flow cross section of the fluidic connection between the outlet opening and the inlet of the powder separation system when the amount of compressed air supplied to the powder container per unit of time falls below a predetermined value.

4. The system according to claim 1,
wherein a pressure sensor system is further provided for measuring a resultant pressure in the powder container.

5. The system according to claim 4,
wherein the first controller is further configured to regulate the effective flow cross section of the fluidic connection between the outlet opening and the inlet of the powder separation system as a function of a detected pressure such that the detected pressure value does not exceed a predetermined pressure value, the effective flow cross section being regulated by controlling the valve or gate provided in the fluidic connection between the outlet opening and the inlet of the powder separation system.

6. The system according to claim 4,
wherein the pressure sensor system is further configured to determine a difference between the pressure in the powder container and a pressure at the inlet of the powder separation system, and wherein the first controller is configured to regulate the effective flow cross section of the fluidic connection between the outlet opening and the inlet of the powder separation system as a function of the pressure difference determined such that a determined pressure value does not exceed or fall short of a predetermined pressure value.

7. The system according to claim 1,
wherein a controllable gate is further provided to selectively form a fluidic connection between the outlet opening and external atmosphere.

8. The system according to claim 7,
wherein the gate comprises a Y-piece which is fluidly connectable on one side to the powder chamber via the outlet opening provided in the side wall of the powder container and which is selectively connected on the other side to external atmosphere or to the inlet of the powder separation system.

9. The system according to claim 7, wherein the gate comprises at least one valve mechanism for selectively disconnecting the fluidic connection between the powder chamber and the external atmosphere or the inlet of the powder separation system respectively, wherein the valve mechanism comprises at least one pneumatically controllable valve.

10. The system according to claim 1, further comprising: a fluidizing device for introducing fluidizing compressed air into the powder chamber, wherein the powder chamber comprises at least one fluidizing compressed air outlet having an outlet opening for discharging the fluidizing compressed air introduced into the powder chamber.

11. The system according to claim 10, wherein the outlet opening of the fluidizing compressed air outlet is identical to the outlet opening provided in a side wall of the powder container.

12. The system according to claim 10, wherein the at least one fluidizing compressed air outlet comprises a first vent line which is connectable to a riser tube external of the powder container in order to prevent a discharge of powder from the powder chamber during the powder-coating mode of the powder coating system.

13. The system according to claim 12, wherein the at least one fluidizing compressed air outlet comprises a second vent line which is connectable on one side to the outlet opening of the fluidizing compressed air outlet and discharges on the other side into a suction funnel of an exhaust system.

14. The system according to claim 1, wherein the powder separation system comprises at least one cyclone separator for the coarse separation of powder from an air/powder mixture supplied to the cyclone separator, wherein the outlet of the at least one cyclone separator is connected or connectable to the inlet of at least one afterfilter device.

15. The system according to claim 1, wherein the powder chamber has a volume of 30 to 150 liters.

16. The system according to claim 1, wherein at least one powder outlet is provided in a bottom wall of the powder container which can be opened by a pinch valve in order to selectively remove coating powder from the powder chamber by the force of gravity.

17. A system comprising a powder coating system, a powder separation system, and a powder container configured to supply coating powder to the powder coating system,
wherein the powder container comprises a powder chamber for coating powder delimited by side walls,
wherein an opening able to be closed by a cover is provided in an upper side wall delimiting the powder chamber,
wherein an outlet opening is provided in a side wall of the powder container via which the powder chamber is configured to be fluidly connected to an inlet of the powder separation system,
wherein an effective flow cross section of a fluidic connection between the outlet opening and the inlet of the powder separation system is configured to be variably adjustable,
wherein one or more controllers are further provided,
wherein a first controller of the one or more controllers is configured to regulate the effective flow cross section of the fluidic connection between the outlet opening and the inlet of the powder separation system as a function of an operating mode of the powder coating system or powder container, and
wherein:
the first controller is configured to increase the effective flow cross section of the fluidic connection between the outlet opening and the inlet of the powder separation system when the operating mode of the powder coating system or powder container changes from a powder-coating mode to a cleaning mode by controlling a valve or gate provided in the fluidic connection between the outlet opening and the inlet of the powder separation system; and/or
the first controller is configured to reduce the effective flow cross section of the fluidic connection between the outlet opening and the inlet of the powder separation system when the operating mode of the powder coating system or powder container changes from a cleaning mode to a powder-coating mode by controlling the valve or gate provided in the fluidic connection between the outlet opening and the inlet of the powder separation system.

* * * * *

UNITED STATES PATENT AND TRADEMARK OFFICE
CERTIFICATE OF CORRECTION

PATENT NO. : 10,589,302 B2
APPLICATION NO. : 15/526745
DATED : March 17, 2020
INVENTOR(S) : Felix Mauchle and Paulo Dos Reis Page 1 of 1

It is certified that error appears in the above-identified patent and that said Letters Patent is hereby corrected as shown below:

In the Specification

Column 5, Line 44:
Delete "51"
Insert --S1--

Column 5, Line 47:
Delete "51"
Insert --S1--

Signed and Sealed this
Sixteenth Day of June, 2020

Andrei Iancu
*Director of the United States Patent and Trademark Office*